INVENTOR.
EUGENE J. HOUDRY
BY
ATTORNEY

Jan. 12, 1960 E. J. HOUDRY 2,921,035
CATALYST MANUFACTURE
Filed July 19, 1954 3 Sheets-Sheet 3

INVENTOR.
EUGENE J. HOUDRY
BY
ATTORNEY

2,921,035

CATALYST MANUFACTURE

Eugene J. Houdry, Ardmore, Pa., assignor to Oxy-Catalyst, Inc., a corporation of Pennsylvania Application July 19, 1954, Serial No. 444,275

9 Claims. (Cl. 252—463)

This invention relates generally to the manufacture of catalysts and in particular is concerned with a method for depositing a hard, relatively thin film of a catalytically active inorganic oxide such as catalytically active alumina on a supporting surface.

In the preparation of certain types of catalysts which involve the use of catalytically active forms of alumina or similar oxides, I have found that a catalytic structure of excellent properties can be obtained in many cases by depositing the oxide in catalytically active form on the surface of a substantially impervious support as a relatively thin, superficial film. In the preparation of oxidation catalysts, for example, I have found that a catalytic structure of superior durability and activity may be prepared by depositing a thin film of catalytically active alumina on the surface of a suitable supporting material such as a dense porcelain (for example of the type used in the manufacture of spark plugs), the film thus produced being thereafter impregnated with a finely divided metal such as platinum. Catalysts of this type are described and claimed in my copending application Serial Number 312,152, filed September 29, 1952, now U.S. Patent No. 2,742,437 and entitled Catalytic Structure and Composition.

In such a catalytic structure it is of great importance that the film of catalytically active oxide adhere firmly and uniformly to the surface of the support and possess a relatively high degree of hardness. A film of this type which is soft and porous and which consequently has a tendency to chalk may be literally blown off the supporting surface in a short time by the stream of reactants. Since in many cases, the catalytic film may have a thickness of the order of only about .003" for example, needless to say the hardness and adherence of the film, its ability to resist erosive influences and mechanical shock which might tend to dislodge it, is of prime importance in determining the useful life of the catalyst.

The preparation of such a film having these desired characteristics is not without difficulty because of the character of the catalytic material and the fact that the methods by which the film may be deposited are limited to those which do not tend to lessen or destroy its catalytic activity. The materials with which the invention is concerned, namely difficulty reducible inorganic oxides, such as alumina, which form gelatinous hydrated oxides and which are prepared in catalytically active form by dehydration under controlled conditions of the hydrated oxide to form structures of large internal pore volume and surface area, must be of relatively high purity to display and retain their catalytic activity during use. Thus, the presence of less than small percentages of extraneous material such as iron, or of alkali metals such as sodium and potassium, may seriously affect or destroy the catalytic activity of these materials. Consequently, the use of these or similar extraneous materials as fluxing or binding agents to improve the hardness and adherence of the film is not always possible. Likewise, since the catalytic activity of these materials is destroyed by sintering or fusion at high temperatures, which causes collapse of the highly porous structure which is essential to catalytic activity, such techniques cannot be employed in the production of these catalytic films.

In earlier attempts to produce a film of a catalytically active oxide on a supporting surface, the support was dipped into a solution of a metal salt which was then decomposed by heat into the corresponding oxide, and this successive dipping and decomposition operation repeated until a film of suitable thickness was built up. For example, a film of catalytically active alumina on a porcelain surface was built up by successivelly dipping a substantially impervious porcelain support into a concentrated solution of aluminum nitrate and thereafter decomposing the nitrate into catalytic alumina by heat. In this manner, a suitable film of alumina of reasonable hardness could be obtained. However, the many successive dippings and decompositions required to produce a film of suitable thickness makes this method a tedious and expensive one. Attempts to produce a film of alumina by dipping the support into a water slurry of catalytically active alumina powder were unsuccessful. Due to the normally uncohesive nature of the alumina particles, only a very uneven deposit of the alumina adhered to the support which chalked off very quickly.

It was then discovered that reasonably satisfactory films of alumina of suitable thickness could be prepared in one dipping operation by dipping a support in a slurry consisting of a finely divided catalytically active alumnia dispersed in a vehicle consisting for example of a concentrated aqueous solution of aluminum nitrate or other aluminum salt. Such a method is described in United States Patent 2,580,806, issued January 1, 1952. Although an excellent catalytic structure may be prepared by this method its useful life is considerably shortened by the tendency of the film of the oxide to undergo chalking and to be removed by relatively mild erosive influences.

I have now found that films of catalytically active alumina and of catalytically active forms of similar inorganic oxides having improved adherence to the supporting surface and greatly improved resistance to erosive influences may be produced by contacting the surface to be coated with a suspension containing the oxide in an at least potentially active but non-gelatinous form and in a critically fine degree of subdivision. As will appear from the description and illustrative examples which follow, the degree of subdivision of the oxide in the film-forming suspension is of critical importance in determining the character of the film particularly its smoothness, hardness and resistance to chalking. Little or only relatively minor improvement in these characteristics is obtained by particle size reduction until the required degree of subdivision, as specified hereinafter, has been achieved, whereas when this degree of subdivision has been reached, an unexpectedly sudden improvement in the film quality is obtained.

The oxide in its required degree of subdivision is generally characterized by a relatively high specific surface contributed largely by sub-micron particles, and by the absence of more than negligible weight percentages of particles of over 40 microns in size. More specifically, the subdivided material should have a specific surface of at least 60,000 cm.$^2$/cm.$^3$ (as determined in the manner hereinafter explained) and preferably of at least 65,000 cm.$^2$/cm.$^3$ and consist substantially 100% by weight of particles of less than 40 microns and preferably less than 25 microns in size.

In general any device or technique for particle reduction may be employed which is capable of effecting the required degree of size reduction and which does not detrimentally affect the catalytic properties of the starting material. Preferably, at least the final portion of the particle reduction is conducted by wet grinding procedure, starting most desirably with the material in the form of a relatively fine powder, such as one passing 100 mesh or finer, suspended in a liquid vehicle and preferably in an aqueous vehicle. One method that has been found to be particularly effective involves a so-called colloid-milling type operation in which a liquid slurry, and preferably an aqueous slurry, of the starting material is passed between closely-spaced surfaces at least one of which is rapidly rotating thereby subjecting the material to size reduction by an action which at least in part involves a high degree of hydraulic shear. Using such a reduction technique, and without substantially disturbing the normal particle size distribution usually obtained in this type of reduction, the degree of reduction required according to the invention is reached when substantially 100% by weight of the material has been reduced to particles of less than 40 microns and preferably less than 25 microns in size, with at least 50% by weight consisting of particles ranging from about .01 micron to about 2 microns in size. With a particle size distribution of this character obtained in such a reduction operation the specific surface of the material will generally range of the order of or above 60,000 or 65,000 cm.$^2$/cm.$^3$ due chiefly to the presence of a large weight percentage of sub-micron particles.

The colloid-milling technique mentioned above, and to be described in more detail hereinafter, has the advantages of offering a highly intense action without substantially contaminating the starting material with extraneous substances during the size reduction operation. Most desirably a milling operation is employed in which the intensity of the reduction forces can be progressively increased as the reduction proceeds. Less intense reduction techniques such for example as a conventional ball milling operation will generally not produce the desired degree of size reduction within a reasonable period of time although such less intensive techniques may be employed preliminary to a more drastic reduction.

In determining whether any given sample of the starting material has been reduced to the required degree of fineness, examination of the sample for particle size and specific surface may of course be made by any method which will give reproducible results, such, for example, as electron microscope examination, sedimentation analyses or a combination of these or other techniques. It should, however, be noted that the absolute values obtained as to particle size, particle size distribution and specific surface will vary somewhat depending upon the particular techniques used to determine these characteristics. Since such absolute values are relative to some extent to the method by which they are obtained, only those values which are obtained by the same or substantially equivalent methods can be strictly compared. The numerical values given herein for particle size and specific surface were determined by a combination of sedimentation analysis and electron microscope examination in a manner which will be outlined hereinafter in detail and it is to be understood that these values are strictly comparable only to values determined in the same or in a substantially equivalent manner.

In addition to particle size examination, it has been found that other methods may be used for determining when the required degree of subdivision has been obtained. When, for example, the particle size reduction is carried out by a wet grinding procedure using an aqueous suspending medium, it has been found that the required degree of subdivision can be determined readily and with a good degree of accuracy by observation of the physical appearance and characteristics of the aqueous slurry. If, for example, a starting slurry is formed consisting of the oxide in particulate form suspended in about an equal weight of water, and this suspension subjected to a colloid milling or to a similar suitable particle size reduction operation of sufficient intensity, it will be found that as the reduction proceeds, the slurry becomes gradually more smooth and creamy in character and gradually increases in viscosity until eventually a smooth paste is obtained having a consistency similar to that of a plaster mix suitable for troweling, which shows little or no tendency to separate into two phases even on prolonged standing. The ability of the subdivided material to thus form substantially non-separating slurries of viscous consistency, with an approximately equal weight of water has been found to be a quick and convenient method for determining when the required degree of subdivision has been obtained although very considerable improvements in the quality of the film may result somewhat before this phenomenon is clearly observable.

Catalytic films that may be prepared in accordance with the invention generally include those comprised of difficultly reducible inorganic oxides of the type which may be prepared in the form of gelatinous hydrated oxides, and which are prepared in catalytically active form by dehydration of the hydrated oxide under controlled conditions to form structures of large internal pore volume and surface area. Materials of this class which have been found to be suitable include alumina, beryllia, zirconia, thoria, magnesia and silica. Particularly good results are obtained according to the invention for producing films of a catalytically active alumina or of a combination of active alumina with another oxide in this group, particularly combinations of alumina with beryllia or with zirconia. Films composed of or containing catalytic alumina are generally harder and less subject to removal by erosive influences than films composed of inherently softer materials such as berryllia and magnesia.

It is, of course, well known in the art that only certain forms of these inorganic oxides are catalytically active. The catalytically active or so called adsorptive forms of these oxides is characterized by a porous structure which possesses a large internal pore volume and surface area, and as previously stated, are prepared in this form by controlled dehydration of a hydrated form of the oxide, control of temperature during such dehydration being essential to prevent destruction of the porous structure. In the case of alumina, for example, certain forms, such as the so-called alpha alumina, also frequently referred to as corundum or Alundum, possesses substantially no catalytic properties, being characterized by a relatively dense structure having little or no internal pore volume or surface area. Catalytically active alumina, on the other hand, may be prepared for example by precipitating a hydrous alumina gel from a solution of an aluminum salt, drying the gel, and thereafter heating carefully at a temperature no higher than about 2000° F. to expel the hydrated water and produce a partially anhydrous or substantially anhydrous oxide which is often referred to as gamma alumina. Catalytically active alumina may also be prepared from the naturally occurring bauxite, which contains hydrated alumina by removal of the impurities which it contains such as iron and silicates, followed by heating at a temperature below about 2000° F. to drive off the hydrated water. This heating procedure at controlled temperature to drive off hydrated water is commonly termed activation or calcination. The completely hydrated form of these oxides possessses substantially no catalytic activity although it is said to be potentially active since it may be rendered catalytically active by calcination to provide the anhydrous or partially anhydrous form.

The degree of purity required in these oxides for catalytic use depends somewhat upon the particular type of catalyst to be prepared and the conditions under which it is to be used. Generally speaking, however, in the production of good quality catalysts, the oxide should be of high purity preferably containing no more than fractional percentages of materials such as iron and sodium, which often tend to detrimentally affect the activity.

As stated previously, the film-forming suspension should contain the finely divided oxide in an at least potentially active but non-gelatinous form, which, in a mechanical reduction operation, such as a wet grinding procedure, requires that the oxide be in this form when the particle size reduction is carried out. Thus, suitable starting materials for such a reduction operation include a fully hydrated form of the oxide, such as alumina trihydrate, which is potentially active, that is capable of being rendered catalytically active by calcination, and also include partially or completely activated forms of the oxide such as a partially or almost completely anhydrous alumina hydrate prepared by controlled calcination of the hydrated form. The starting oxide, however, should be non-gelatinous in character, that is the original gel, in cases where the oxide is prepared by precipitation, should be evaporated substantially to dryness, thus removing substantially all of the loosely bound water present in the original gel. For example, in the preparation of alumina from a solution of aluminum nitrate, a gelatinous hydrated oxide may be produced by precipitation by the addition of ammonium hydroxide to the aluminum nitrate solution. The gelatinous precipitate thus produced containing large amounts of loosely bound water of gelation, should be evaporated at least substantially to dryness thus producing a hydrated but non-gelatinous form such as alumina trihydrate.

Preferably, the particle size reduction is carried out using an oxide which has been subjected to an intermediate degree of calcination to produce a partially anhydrous and catalytically active form. Most desirably, the calcination or removal of chemically combined water is carried to a point at which a major portion but not all of the chemically combined water is removed. In the case of alumina, for example, most desirably the particle size reduction is carried out on an alumina hydrate which has been partially calcined to produce a partially hydrated form containing between about 5% and 20% by weight of chemically combined water. The fully hydrated alumina or alumina trihydrate contains about 35% by weight of chemically combined water. In general, catalytic films of the highest quality are produced when the film-forming suspension contains the finely divided oxide in such an intermediate degree of calcination. When the film is deposited from a suspension of particles in fully hydrated form, the film in general tends to be softer and consequently more subject to removal by erosive influences; when deposited from a suspension containing the finely divided oxide in a high degree of calcination, containing for example less than 1% or 2% by weight of combined water, the film produced often tends to be more brittle and flaky in character. A further disadvantage in using a highly calcined though catalytically active form of the oxide is that such forms tend to be rather hard and abrasive in character which renders the reduction operation more difficult and costly.

The liquid, and preferably aqueous, suspension or slurry of the finely divided oxide from which the film is deposited should be adjusted to a solids concentration so as to produce a suspension which is preferably slightly syrupy in character, the film being preferably deposited by dipping the surface to be coated in such suspension, removing, and draining off excess material and then drying. The optimum solids concentration in the film-forming slurry will vary somewhat depending upon the particular oxide used and the thickness of the film desired, but for many applications will range of the order of 20% to 40% by weight of suspended solids. According to the preferred and most advantageous form of the invention, the oxide film is deposited according to the method described in United States Patent No. 2,580,806. Following this method, the finely divided oxide, such as alumina, is suspended in an aqueous solution of a compound such as aluminum nitrate which decomposes into the catalytical form of the oxide, the film being deposited preferably by dipping the support into this mixture, draining, drying, and heating to decompose the aluminum nitrate into catalytic alumina. The dissolved compound, when decomposed, apparently has the effect of knitting the oxide particles together into a coherent structure. When such a method is used with the oxide particles reduced to a degree of fineness as herein specified, the full advantages of the invention are obtained; the films produced having both excellent catalytic activity and excellent physical properties.

The dissolved compound generally speaking should be one which decomposes readily into a catalytically active oxide of the type with which the invention is concerned and one which has relatively good water solubility. Water soluble salts of aluminum and strong acids, such as aluminum chloride and particularly aluminum nitrate, are particularly desirable for this purpose. Water soluble salts, readily decomposable into beryllia, thoria, magnesia, or silica, although not as generally desirable as aluminum salts for this purpose may be used in some cases. The nitrates of the metals mentioned generally give the best results, having good water solubility and decomposing relatively easily by heat at relatively low temperatures.

The character of the support on which the film is deposited is not critical and a great variety of materials can be used for this purpose. The support should, of course, be composed of a material which does not detrimentally affect the catalytic activity of the film under the particular conditions under which the catalyst is used. In the production of oxidation catalysts for use at high temperature up to about 1800° F., a support composed of a material such as a dense porcelain of the type which is used in spark plug manufacture is highly desirable since it is substantially inert and consequently has little or no effect on the catalytic properties of the film of alumina or similar oxide; because it is itself capable of withstanding high temperatures without deleterious effects; and because it has a coefficient of expansion similar to the catalytic oxides in question with the result that there is little or no tendency for the oxide film to become dislodged in use because of alternate heating and cooling of the catalyst structure. In some cases, the use of a metallic support will be found desirable such as for the production of a catalyst consisting of a metallic, electrically heated resistance wire provided with a film of catalytically active oxide.

Generally speaking, the catalytic oxide film should be relatively quite thin, for many applications not in excess of about .015" in thickness. Films having thicknesses much above this order of magnitude often tend to crack and break off the support. When metal supports are used, films having thicknesses well below .015" are preferred because of the large differences in the coefficients of expansion of the metal and of the oxide coating.

In order to produce a superficial film on the support as distinguished from an impregnation of the support as a whole, the supporting surface should be substantially impervious in character, that is devoid of large pores such as would cause the film-forming suspension to impregnate the body of the support rather than to form a superficial film on its surface. Some degree of surface porosity however is not undesirable and in fact may be advantageous. Using a porcelain support, for example, the presence of a small, preferably sub-microscopic pores in the porcelain results in a firmer adherence of the film. Where the supporting surface is substantially devoid of surface porosity such as a smooth metal wire, glass, or enamelled surface, certain combinations of oxides, such as combinations of catalytically active alumina with beryllia, or alumina and zirconia, have been found particularly desirable, these combinations having been found to

7 adhere more uniformly and tenaciously to such non-porous surfaces.

EXAMPLE I

A partially calcined alumina hydrate in powder form was mixed with water in the proportions of 5 kilograms of alumina powder in sufficient water to give 8 litres of slurry. The catalytic grade alumina powder employed was a free flowing powder having the following sieve analysis: 100% passing 150-mesh; 50% to 60% retained on 300-mesh; 40% to 50% passing 300-mesh; and had the following analysis:

| | Percent |
|---|---|
| $Al_2O_3$ | 90.2 |
| $Na_2O$ | 0.43 |
| $Fe_2O_3$ | Less than 0.36 |
| $SiO_2$ | Less than 0.18 |
| Combined $H_2O$ | 9.1 |

This mixture was passed repeatedly through a colloid mill, being careful to maintain uniformity of the slurry by agitation. The colloid mill employed is manufactured by the Troy Engine & Machine Company, of Troy, Pennsylvania, and consists of a rotating disc and a stationary disc which may be metal or ceramic faced, with means for adjusting the clearance between these discs, and thus adjusting the intensity of the reduction action. The rotating disc revolves at a speed of 20,000 r.p.m. while the slurry is pumped between it and the stator.

The original mixture was passed through this mill a total of eight times. During the first pass the clearance between the stator and rotor was adjusted to about .005". During the succeeding passes this clearance was reduced to zero clearance and below, that is the discs were biased toward one another with considerable force so that in the absence of the film of slurry pumped between them which acts as a lubricant, they would be directly in contact. The action produced by the mill operated in this manner is believed to be a combination of hydraulic shear and attrition caused by inter-particle attrition and direct attrition between the surfaces of the discs. This latter attrition action is evidenced by the fact that the surface of the discs tend to show progressive wear.

A sample of the slurry was withdrawn after each pass and set aside for testing and observation. These samples were numbered in order from 0 to 8, corresponding to the starting slurry, and the slurry after the first, second, third, etc., pass through the mill.

During the first five passes through the mill, the viscosity of the slurry did not change significantly; on the sixth pass a definite increase in viscosity was noted, the slurry having the pour characteristics of a thick syrup. On the seventh and eighth passes the viscosity increased still further and acquired a smooth, semi-self-sustaining consistency similar to the consistency of a plaster when mixed with the proper amount of water for troweling.

As the particle reduction proceeded, the tendency toward phase separation progressively decreased, until in the samples obtained from the last two or three passes through the mill, containing approximately 50% by weight of water (solids content determined by evaporating the water slurry at a temperature of the order of 200° F. to 250° F.) very little phase separation occurred even after prolonged periods of standing. Samples of the earlier passes when set aside settled rather rapidly into a supernatant water phase with a lower, solids-containing phase.

The particle size distribution in the samples from the third to the eighth pass through the mill (samples 3 to 8) was determined in the following manner. One set of particle size distribution analyses were made using the Bouyoucas hydrometer method which is based upon Stokes' law for the settling rate of particles suspended in a fluid. A typical procedure using this method is described in ASTM Standard (1952), Part 3, published by American Society for Testing Materials, pages 1420 to 1430 (ASTM designation: D422–51), and this method is also described in Kaolin Clays and Their Industrial Uses, published by J. M. Huber Corporation, New York, N.Y., page 99.

Figure 2:
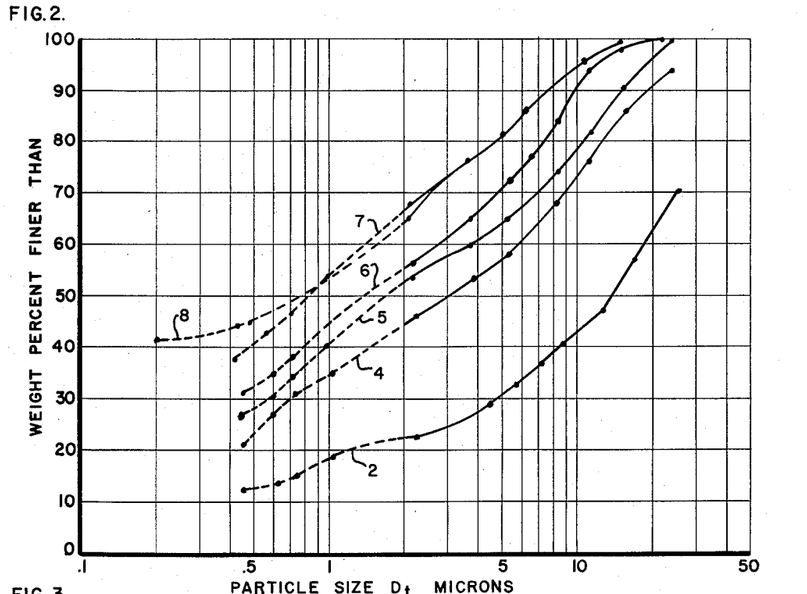

The results of sedimentation analyses by this method on samples 2, 4, 5, 6, 7 and 8 (corresponding respectively to the samples taken after the second, fourth, fifth, sixth, seventh and eighth passes through the colloid mill) are illustrated in Fig. 2 of the drawings, where each curve is labeled with the number corresponding to the sample number which it represents. As may be seen, these curves are plotted on a semi-logarithmic scale, the percent by weight being plotted against the log of the particle size ($D_t$) in microns. Experimental points are shown by dots.

Since Stokes' law measurements assume that the particles are in the form of spheres, departures from the spherical shape tend to produce relatively large errors in the determination when the particles being examined by the sedimentation method are less than about 2 microns in size. Since the particles reduced in size in the manner described deviate considerably from the spherical form, and seem in some cases to be in the form of rather thin plates, particle size of this material as determined by sedimentation method cannot be considered completely reliable and for this reason, the portion of each curve in Fig. 2 below 2 microns is shown as a broken line.

To accurately determine the particle size distribution in the range below about 2 microns, electron microscope examination of samples 3 to 8 inclusive was carried out at magnifications of 10,470× and 32,500×. Slides were prepared for the electron microscope by mixing one drop of 0.2% formvar in ethylene dichloride with 2 drops of a sample and mixing for about 15 seconds between a pair of glass slides by moving the slides against one another with a rotary motion using slight finger pressure. Electron micrographs were taken of the samples thus prepared and all particles in the field which were observed at the 10,470× magnification were counted, while particles of 0.037 micron in diameter or larger were measured and classified into "bins" or groups having diameters within a stated range. A sufficiently large field was examined to permit measuring of the order of 250 or more particles per sample. Measurement of the smaller particles was done at a magnification of 32,500×. Based on these observations, the percent of particles in each bin based on the total number of particles counted was determined. These percentages are tabulated in the table below:

*Table I*

| Bin | Bin Size, Microns | Percent of Particles in Each Bin | | | | | |
|---|---|---|---|---|---|---|---|
| | | Sample 3 | Sample 4 | Sample 5 | Sample 6 | Sample 7 | Sample 8 |
| 2 | .037 | 83.31 | 35.98 | 42.75 | 31.53 | 49.15 | 11.24 |
| 3 | .053 | 3.95 | 14.30 | 4.25 | 24.00 | 2.90 | 15.20 |
| 4 | .073 | 2.35 | 16.10 | 8.00 | 18.00 | 6.60 | 19.00 |
| 5 | .107 | 3.30 | 10.70 | 8.50 | 10.00 | 10.00 | 19.40 |
| 6 | .150 | 2.25 | 10.50 | 7.50 | 6.10 | 9.20 | 18.00 |
| 7 | .215 | 1.78 | 4.30 | 8.50 | 3.50 | 8.90 | 6.20 |
| 8 | .300 | 1.26 | 3.00 | 6.60 | 2.90 | 4.70 | 6.39 |
| 9 | .430 | 0.70 | 2.07 | 4.80 | 2.30 | 3.90 | 2.40 |
| 10 | .600 | 0.48 | .98 | 2.70 | 0.76 | 2.70 | 1.20 |
| 11 | .850 | 0.48 | 1.13 | 4.30 | 0.46 | 0.90 | 0.53 |
| 12 | 1.2 | 0.19 | 0.66 | 1.40 | 0.30 | 0.30 | 0.34 |
| 13 | 1.7 | 0.27 | 0.12 | 0.70 | 0.15 | 0.45 | 0.19 |
| 14 | 2.4 | 0.09 | 0.12 | | | 0.15 | |
| 15 | 3.5 | | 0.04 | | | 0.15 | |
| 16 | 4.75 | 0.09 | | | | | |

Figure 1:
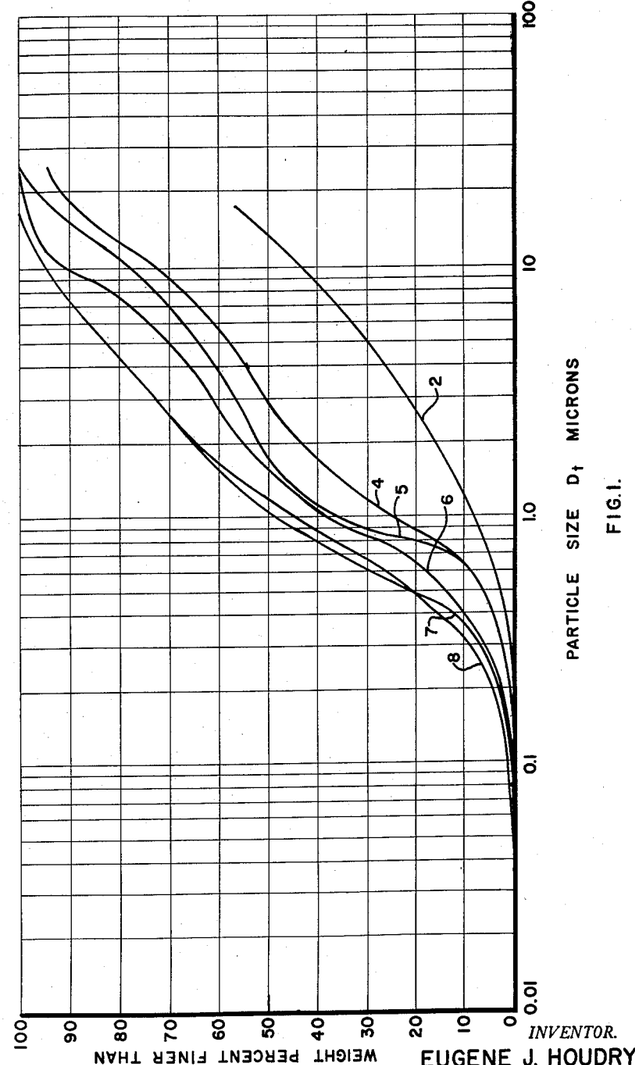

From the data in Table I, the particle size distribution in samples 3 to 8 was determined for the range below 2 microns by calculating the weight ratios of particles in each bin below 2 microns in size and then relating these ratios to the total sample by taking the value for the total weight of particles below 2 microns from the sedimentation data. In sample 5, for example, the sedimentation date (see Fig. 2) shows that approximately 52% of the weight of the material is in particles of less than 2 microns in size. The distribution in this 52% can be determined knowing the weight ratios (as determined from Table I) of particles in each of the bins below 2 microns. The distribution curves thus determined for particles below 2 microns in size were combined with the particle size distribution curves for particles above 2 microns in size as determined by sedimentation analyses (solid portion of curves in Fig. 2) and these combined curves are shown in Fig. 1. From the above it is clear that in the curves shown in Fig. 1, the particle size distribution above 2 microns is as determined by sedimentation analyses, while that below 2 microns is as determined by electron microscope examination. A comparison of Fig. 1 with Fig. 2 shows that higher values for "percent finer than" are obtained by sedimentation techniques for particle sizes below 2 microns than are obtained by electron microscope analysis.

From the curves in Fig. 1, the specific surface of the material in each sample from 4 through 8, as expressed in square centimeters of particle surface per cubic centimeter of volume was determined by stepwise graphical integration of these curves using the relation:

$$\text{Specific surface in cm.}^2/\text{cm.}^3 = \frac{60,000}{D_t}$$

where $D_t$ is apparent particle size in microns as shown by the curves in Fig. 1, the total specific surface for each sample being, of course, the summation of the partial specific surfaces determined by using the above relation over small ranges of particle size along the length of the curve. This method of determining specific surface assumes that each particle is spherical or cubical in shape with a diameter or side equal to $D_t$ and of course represents only the external geometric surface of the particles and not the internal surface area resulting from pores and fissures. Specific surface determined by other methods, such as by light scattering techniques, may result in somewhat different numerical values.

Figure 4:
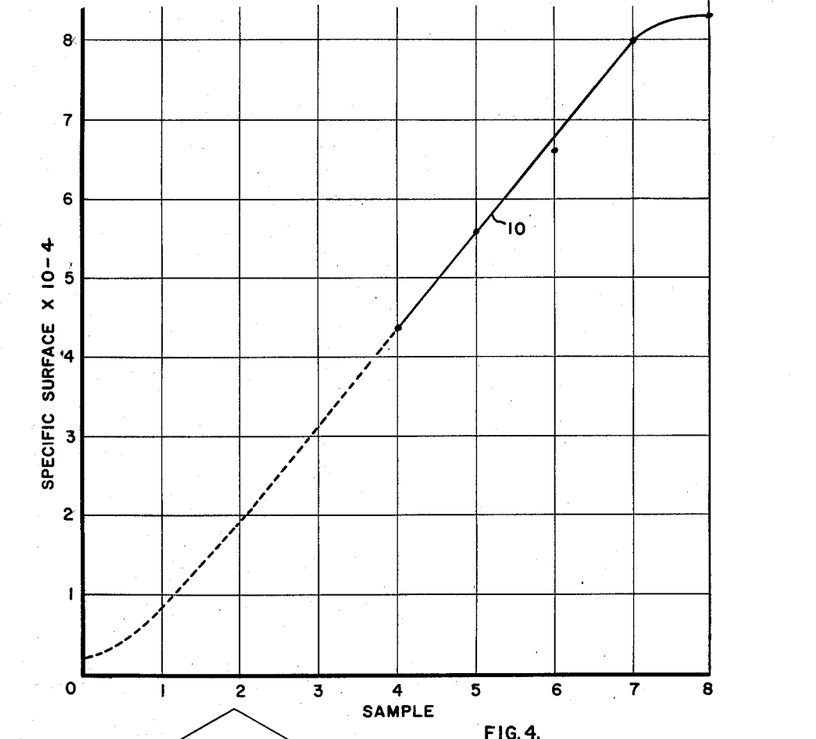
Figure 5:
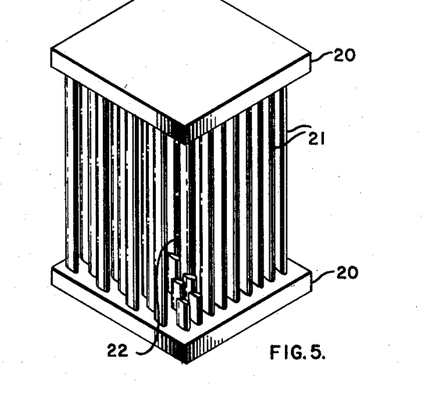

The values thus determined for specific surface for samples 4 to 8 are plotted in Fig. 4 of the drawings against sample number, curve 10 thus illustrating the rate at which specific surface varies with the successive passes through the colloid mill. The lower dotted portion of the curve is extrapolated. The curve indicates that the specific surface increases at a relatively constant rate with successive passes through the mill.

In order to illustrate the improvement in film quality provided by carrying particle size reduction to the required degree, films were prepared from each of the samples 0 through 8. To prepare a suspension suitable for the film-forming operation, a sufficient quantity of a saturated solution of aluminum nitrate (636 grams of $Al(NO_3)_3 \cdot 9H_2O$ per litre of solution) and a sufficient quantity of aluminum nitrate crystals were added to each sample to provide a slurry consisting of one gram of alumina particles to 2.4 cubic centimeters of saturated aluminum nitrate solution. Porcelain rods of a high quality porcelain, similar to that used in the manufacture of spark plugs, having a pore volume of about 19.5% made up of sub-microscopic pores, were used as supports in preparing the film in each case. A porcelain rod was dipped in the film-forming slurry made up from each sample, allowed to remain immersed for 30 seconds, removed, and then drained. The films were dried slowly at a temperature of about 200° F. until free water was removed and then heated to a temperature of about 450° F. to decompose the aluminum nitrate to alumina. Film thicknesses in each case were of the order of .003".

Each of the porcelain rods, carrying its film of alumina, was examined by a number of observers and each film was classified as to quality using the following tests: (a) hardness to scratch with a knife or fingernail, (b) freedom from chalking, (c) smoothness. The results of these tests are listed in Table II below:

Table II

| Sample # from which film was prepared | Hardness | Resistance to Chalking | Smoothness |
|---|---|---|---|
| 0 | Very poor | Chalked off very readily by finger rubbing. | Very rough and uneven. |
| 1 | do | do | Rough and uneven. |
| 2 | do | do | Fair. |
| 3 | Poor | Poor | Do. |
| 4 | do | do | Do. |
| 5 | do | do | Good. |
| 6 | Good | Very Good | Excellent. |
| 7 | Excellent | Excellent | Do. |
| 8 | do | do | Do. |

As illustrated by the above table, very little improvement in the quality of the film is obtained until a degree of particle size reduction characterizing that obtained between about the fifth and sixth passes through the colloid mill has been reached, although well before this point is reached the material would be considered by ordinary standards to be in a very finely divided condition. The change in the character of the film as the material is reduced to a fineness somewhat greater than that characterizing sample 5 appears to be one of kind rather than of degree as contrasted to the relatively slight improvements obtained in the earlier stages of particle size reduction.

EXAMPLE II

A catalytic grade beryllia powder was mixed with an equal weight of water to form a slurry. The beryllia employed was a product of the Brush Beryllium Company, was calcined at a temperature of about 600° C., and had the following analysis:

|  | Percent |
|---|---|
| BeO | 93.02 |
| Fe | .053 |
| Al | .343 |
| Si | .059 |
| Mn | .0764 |
| Ni | .0045 |
| Insolubles | .081 |
| Combined water (loss on ignition) | 5.21 |

This slurry was passed through a colloid mill of the same type and in the same manner as in Example I for a total of seven passes. Samples were collected and set aside at the end of each pass, as well as a sample of the starting slurry, these samples being labeled 0–A to 7–A respectively. As the particle size reduction proceeded, approximately the same behavior with respect to viscosity increase and progressive decrease in phase separation as in Example I. Samples 5–A, 6–A and 7–A were in the form of smooth paste, similar to samples 7 and 8 in Example I.

Figure 3:
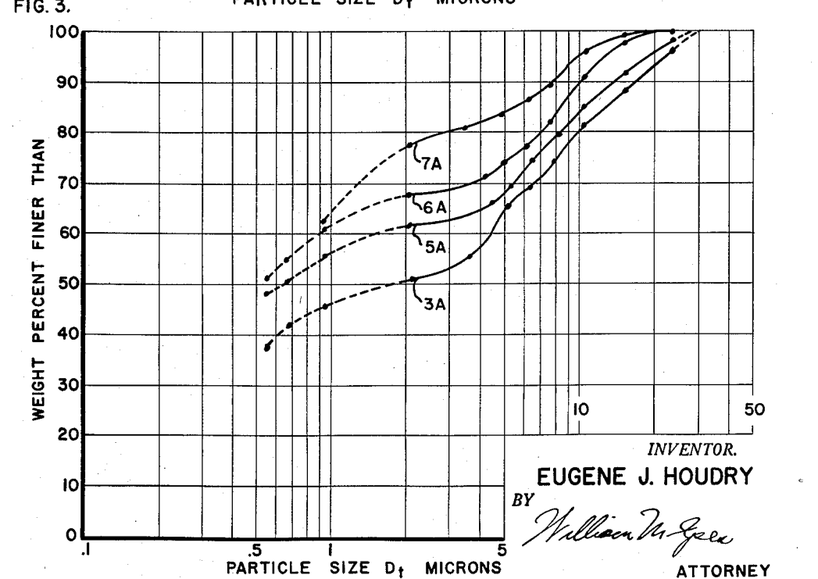

Samples 3–A, 5–A, 6–A and 7–A were analyzed for particle size distribution by sedimentation techniques as in Example I, and the results are illustrated in Fig. 3 of the drawings. As may be seen from these curves, the beryllia reduced somewhat more rapidly, sample 3–A showing substantially the same degree of fineness as sample 5 in Fig. 1.

To show the relative results obtained with respect to film quality resulting from the particle size reduction, beryllia films were prepared from each sample as follows. A film-forming slurry was provided from each sample by mixing the sample with aluminum nitrate crystals in the ratio of 100 grams of sample (containing 42.8% solids as determined by evaporation at 250° F.) to 10 grams of aluminum nitrate crystals $(Al(NO_3)_3 \cdot 9H_2O)$ Porcelain rods were dipped in these mixtures made up from a slurry of the original material and from the material after each pass through the mill. The original material and the first few passes through the mill gave a film of poor quality, while high quality films were prepared from samples 3–A and above, particularly from samples 5–A, 6–A and 7–A. Film thicknesses were of the order of .003".

EXAMPLE III

A 22-gage Nichrome (80% nickel-20% chromium) resistance wire was provided with a film consisting of alumina and beryllia by dipping into a slurry prepared by mixing a water-alumina slurry equivalent to sample 8 in Example I, a beryllia-water slurry equivalent to sample 7–A in Example II, and $Al(NO_3)_3 \cdot 9H_2O$ crystals in the following proportions:

43.5 gms. BeO-water slurry (56% solids)
228.0 gms. $Al_2O_3$-water slurry (44% solids)
16 gms. $Al(NO_3)_3 \cdot 9H_2O$ crystals After dipping in this mixture, the wire was removed, drained, and the excess slurry removed by shaking. The wire was connected to a source of electric current and heated electrically to incipient red heat (about 1000° F.) to dry the film and decompose the aluminum nitrate. The film produced (about .0005" thick) was firmly adherent to the surface of the wire and resistant to chalking and capable of withstanding an indefinite number of expansions and contractions of the wire resulting from alternate heating and cooling from room temperature to red heat. Attempts to produce satisfactory films from material not reduced to the fineness as specified herein were unsuccessful.

An oxidation catalyst of excellent activity was prepared by dipping the wire containing the alumina-beryllia film into an aqueous solution of chloroplatinic acid $$(H_2PtCl_6 \cdot 6H_2O)$$

containing 1% of platinum by weight. The wire was again heated slowly by passing electric current through the wire, bringing the wire to red heat. Complete decomposition of the platinum salt into metallic platinum was accomplished by heating the wire in a gas flame to bright redness. The catalytic structure thus produced has a great many applications as an oxidation catalyst and is particularly useful in catalytically oxidizing trace constituents in a gas stream, such as traces of organic smokes, and small concentrations of organic vapors such as those given off in the roasting or baking of meat or other food products.

EXAMPLE IV

Nichrome resistance wires were provided with catalytically active oxide films having thicknesses of the order of .0005" using the techniques outlined in Example III by dipping in slurries formulated as follows. In each case a catalytically active form of the oxide was used reduced to a fineness substantially equivalent to that of sample 8 and sample 7–A in Examples I and II respectively.

A 5.3 gms. beryllia-water slurry (47.2% solids)
35.0 gms. alumina-water slurry (56.4% solids)
3.2 gms. $Al(NO_3)_3 \cdot 9H_2O$ crystals
8.6 gms. water

B 10.3 gms. BeO-water slurry (47.2% solids)
17.6 gms. $Al_2O_3$-water slurry (56.4% solids)
1.6 gms. $Al(NO_3)_3 \cdot 9H_2O$ crystals
4.3 gms. water

C 45 gms. $ZrO_2$-water slurry (69.0% solids)
44 gms. $Al_2O_3$-water slurry (56.4% solids)
4 gms. $Al(NO_3)_3 \cdot 9H_2O$ crystals

D 38.8 gms. $ThO_2$-water slurry (68% solids)
17.8 gms. $ZrO_2$-water slurry (69.0% solids)
20.0 gms. $Al_2O_3$-water slurry (56.4% solids)
4.0 gms. $Al(NO_3)_3 \cdot 9H_2O$ crystals

E 38.8 gms. $ThO_2$-water slurry (68.0% solids)
17.8 gms. $ZrO_2$-water slurry (69.0% solids)
6.0 gms. $Al(NO_3)_3 \cdot 9H_2O$ crystals All of the above formulations gave firmly adherent, non-chalking catalytic films. When impregnated with a small amount of platinum as in Example III, the film showed the properties of an excellent oxidation catalyst.

One particularly advantageous application of the invention is in the preparation of catalytic films of alumina, beryllia, thoria, zirconia, magnesia or mixtures of these oxides as a carrier for catalytic metals such as platinum, palladium, silver, copper and the like in the production of oxidation catalysts. For example, a supporting structure such as that illustrated in Fig. 4 may be provided with a film of catalytic alumina by the method of this invention and the film of alumina thereafter impregnated with a relatively small amount of platinum. The resulting structure affords a catalytic unit for oxidation reactions of great durability and superior activity. The supporting structure itself which is described and claimed in my copending application Serial No. 159,191, filed May 1, 1950, now U.S. Patent No. 2,730,434, and entitled "Process and Apparatus for Contacting Operations," is preferably composed entirely of ceramic material and consists of a pair of end-plates 20 supported in fixed relation to one another by a center post 22 rigidly fastened at either end to an end plate. A plurality of rows of rod-like elements 21 extend between end plates 20 and are retained in apertures formed in these plates. The rods 21 are preferably formed of a relatively dense, high quality porcelain such as that used in spark-plug manufacture. Such a porcelain having a pore volume of about 20% in the form of sub-microscopic pores is suitable.

Such a structure was provided with a dense, hard film of catalytic alumina by the following procedure. An aqueous slurry of activated alumina of the same type used in Example I was wet ground in a colloid mill in the manner previously described, until it was of the fineness of sample 7 or 8 in Example I. On analysis for solids content by evaporation of its water content, it was found to contain 49.8% solids. Saturated aluminum nitrate solution and aluminum nitrate crystals were added to this slurry to provide a mixture containing one gram of alumina for each 2.4 cc. of saturated aluminum nitrate solution. This mixture was agitated 48 hours to insure complete solution of the aluminum nitrate. In this somewhat syrupy mixture, agitated from time to time to prevent settling, the unit illustrated in Fig. 4 was immersed for a period of thirty seconds, removed, and allowed to drain. It was then placed in an oven at room temperature and the oven temperature was raised to 200° F. over a period of about 2 hours and then kept at 200° F. to 250° F., for an additional five hour period. After removal of the free water by this slow drying, the oven temperature was brought up to about 450° F. over a period of an additional seven hours to decompose the aluminum nitrate into alumina. The film of catalytic alumina prepared by this method was about .003" thick and of excellent hardness, showing no tendency to chalk. To prepare an excellent oxidation catalyst, the alumina film was impregnated with about 1% by weight (based on the weight of alumina) of platinum by dipping the entire unit into a 1% solution by weight of chloroplatinic acid $(H_2PtCl_6 \cdot 6H_2O)$ and decomposing this platinum salt by heat.

The catalytic structure thus produced has excellent activity in catalytic oxidation reactions of many types and may be continuously employed at temperature as high as 1600° F. for months without appreciable loss of activity and with no apparent deterioration of the catalytic film.

It is, of course, well known that catalytic alumina and similar inorganic oxides are suitable carriers for many types of metals and metal oxides for producing suitable catalysts for carrying out many other types of catalytic reactions such as desulfurization, hydrogenation, reforming, aromatization, etc., and accordingly it is unnecessary to give detailed illustrations of the application of the invention to these types of catalysts. Catalytic films of alumina, beryllia, zirconia, thoria, magnesia or silica, prepared by the method described herein may be impregnated or otherwise combined with other catalytic materials by methods well known to those skilled in the art to produce the desired catalyst.

The film of catalytic oxide itself may be of course used per se as a catalyst. For example, a silica-alumina composite prepared for use as a catalyst for the catalytic cracking of hydrocarbons may be deposited as a film on a porcelain support by the method of the invention, and the composite structure used as the cracking catalyst. Usually in this particular application it is desirable to deposit a number of layers of the silica-alumina by successive dipping and drying to build up a relatively thick film.

It is understood that the specific examples given in the foregoing description are intended to illustrate the invention in some of its most advantageous forms and that the invention is not limited thereto. It will be clear to those skilled in the art that many other applications and modifications than those specifically described are included within its scope.

This application is a continuation in part of my copending application Serial No. 340,230, filed March 4, 1953, now abandoned, entitled "Catalyst Manufacture."

I claim:

1. In the manufacture of catalysts, a method for depositing on a substantially catalytically inert, substantially impervious supporting surface a thin, hard film of a catalytically active form of an inorganic oxide selected from the group consisting of alumina, beryllia, zirconia, thoria, magnesia and silica, said method comprising the steps of contacting the supporting surface with a suspension containing the oxide in an at least potentially active but non-gelatinous form and in such degree of subdivision that substantially 100% by weight thereof consists of particles of less than 40 microns in size, and the specific surface thereof is at least 60,000 cm.$^2$/cm.$^3$, thereby depositing a film of said oxide thereon, and thereafter drying said film.

2. In the manufacture of catalysts, a method for depositing on a substantially catalytically inert, substantially impervious supporting surface a thin, hard film of a catalytically active form of an inorganic oxide selected from the group consisting of alumina, beryllia, zirconia, thoria, magnesia and silica, said method comprising the steps of depositing a wet film by contacting the supporting surface with an aqueous suspension containing the oxide in an at least potentially active but non-gelatinous form and in such degree of subdivision that substantially 100% by weight thereof consists of particles of less than 40 microns in size and the specific surface thereof is at least 60,000 cm.$^2$/cm.$^3$, and containing a dissolved compound decomposable into one of the said oxides, thereafter drying said film and heating to decompose said compound.

3. A method in accordance with claim 2 in which the oxide is in such degree of subdivision that substantially 100% by weight thereof consists of particles of less than 25 microns in size and the specific surface thereof is at least 65,000 cm.$^2$/cm.$^3$.

4. In the manufacture of catalysts, a method for depositing on a substantially catalytically inert, substantially impervious supporting surface a thin, hard film of a catalytically active form of an inorganic oxide selected from the group consisting of alumina, beryllia, zirconia, thoria, magnesia and silica, said method comprising the steps of subjecting a partially calcined hydrate of said oxide to particle size reduction until substantially 100% by weight thereof has been reduced to particles of less than 40 microns in size and the specific surface thereof is at least 60,000 cm.$^2$/cm.$^3$, forming a suspension of the finely divided material in an aqueous solution of a compound decomposable into one of said oxides, and contacting the supporting surface with said suspension thereby depositing a film of oxide thereon, thereafter drying said film and heating to decompose said compound.

5. In the manufacture of catalysts, a method for depositing on a substantially catalytically inert, substantially impervious supporting surface a thin, hard film comprised of a catalytically active form of alumina which comprises the steps of contacting the supporting surface with a suspension containing alumina in an at least potentially active but non-gelatinous form and in such degree of subdivision that substantially 100% by weight thereof consists of particles of less than 40 microns in size and the specific surface thereof is at least 60,000 cm.$^2$/cm.$^3$, thereby depositing a film of alumina thereon and thereafter drying said film.

6. In the manufacture of catalysts, a method for depositing on a substantially catalytically inert, substantially impervious supporting surface a thin, hard film comprised of a catalytically active form of alumina which comprises the steps of subjecting a partially calcined alumina hydrate to particle size reduction until substantially 100% thereof has been reduced to particles of less than 40 microns in size and the specific surface thereof is at least 60,000 cm.$^2$/cm.$^3$, forming a suspension of the finely divided alumina in an aqueous solution of a salt of aluminum and a strong acid decomposable by heat into alumina, and contacting the supporting surface with said suspension thereby depositing a film of said alumina thereon, thereafter drying said film and heating to decompose said aluminum salt.

7. A method in accordance with claim 6 in which said partially calcined alumina hydrate contains from 5% to 20% by weight of chemically combined water.

8. In the manufacture of catalysts, a method of depositing on a substantially catalytically inert, substantially impervious supporting surface a thin, hard film of a catalytically active form of an inorganic oxide selected from the group consisting of alumina, beryllia, thoria, magnesia and silica, said method comprising the steps of contacting the supporting surface with a suspension containing the oxide in an at least potentially active but non-gelatinous form and in such degree of subdivision that substantially 100% by weight thereof consists of particles less than 40 microns in size, 50% by weight thereof ranges from about .01 to 2 microns in size, and the specific surface thereof is at least 60,000 cm.$^2$/cm.$^3$, said suspension containing a dissolved compound decomposable into one of said oxides, thereby depositing a film of said oxide on said supporting surface, thereafter drying said film and heating to decompose said compound.

9. In the manufacture of catalysts, a method of depositing on a substantially catalytically inert, substantially impervious supporting surface a thin, hard film comprised of a catalytically active form of alumina which comprises the steps of subjecting a partially calcined alumina hydrate to particle size reduction until substantially 100% thereof has been reduced to particles of less than 40 microns in size, 50% by weight thereof ranges from .01 to 2 microns in size, and the specific surface thereof is at least 60,000 cm.$^2$/cm.$^3$, forming a suspension of the finely divided alumina in an aqueous solution of a salt of aluminum and a strong acid decomposable by heat into alumina, contacting the supporting surface with said suspension, thereby depositing a film of said alumina thereon, thereafter drying said film and heating to decompose said aluminum salt.

References Cited in the file of this patent

UNITED STATES PATENTS

| | | |
|---|---|---|
| 2,423,686 | Cummins | July 8, 1947 |
| 2,580,806 | Malina | Jan. 1, 1952 |
| 2,650,202 | Hawes et al. | Aug. 25, 1953 |
| 2,669,547 | Shabaker | Feb. 16, 1954 |
| 2,686,161 | Stewart | Aug. 10, 1954 |
| 2,742,437 | Houdry | Apr. 17, 1956 |